(12) United States Patent
Badovick et al.

(10) Patent No.: US 10,369,579 B1
(45) Date of Patent: Aug. 6, 2019

(54) MULTI-ORIFICE NOZZLE FOR DROPLET ATOMIZATION

(71) Applicant: Zyxogen, LLC, Franklin, TN (US)

(72) Inventors: Jeff Badovick, Ormond Beach, FL (US); Rafael Rodriguez, Ormond Beach, FL (US)

(73) Assignee: Zyxogen, LLC, Franklin, TN (US)

( * ) Notice: Subject to any disclaimer, the term of this patent is extended or adjusted under 35 U.S.C. 154(b) by 0 days.

(21) Appl. No.: 16/121,115

(22) Filed: Sep. 4, 2018

(51) Int. Cl.
*B05B 7/06* (2006.01)
*B05B 1/14* (2006.01)
*B05B 1/06* (2006.01)
*B05B 7/08* (2006.01)

(52) U.S. Cl.
CPC .............. *B05B 7/061* (2013.01); *B05B 1/06* (2013.01); *B05B 1/14* (2013.01); *B05B 7/06* (2013.01); *B05B 7/0815* (2013.01)

(58) Field of Classification Search
CPC .. B05B 7/061; B05B 7/06; B05B 1/14; B05B 1/06; B05B 7/0815
USPC .... 239/8, 290, 298, 423, 424, 427, 556–559
See application file for complete search history.

(56) References Cited

U.S. PATENT DOCUMENTS

| | | | |
|---|---|---|---|
| 2,887,273 A | 5/1959 | Anderson | |
| 3,343,794 A | 9/1967 | Voitsekhovsky | |
| 3,770,207 A * | 11/1973 | Muller | B05B 7/061 239/424 |
| 3,920,158 A | 11/1975 | Meshberg | |
| 4,141,505 A * | 2/1979 | Reich | F23K 5/20 239/431 |
| 4,601,428 A * | 7/1986 | Kurogo | F23D 11/105 239/427.3 |

(Continued)

FOREIGN PATENT DOCUMENTS

| | | |
|---|---|---|
| AU | 5331800 | 1/2001 |
| AU | 737688 | 8/2001 |

(Continued)

OTHER PUBLICATIONS

Inge L. Rhyming, Analysis of Unsteady Incompressible Jet Nozzle Flow, Journal of Applied Mathematics and Physics, 1973, vol. 24, pp. 149-164.

(Continued)

*Primary Examiner* — Steven J Ganey
(74) *Attorney, Agent, or Firm* — Waller Lansden Dortch & Davis, LLP; Matthew C. Cox

(57) ABSTRACT

The multi-orifice nozzle for droplet atomization includes a head having a plurality of liquid supply channels, a plurality of liquid supply channel entrance openings, and a plurality of liquid supply channel exit openings. A pressure cap is positioned proximate the head, the pressure cap defining a pressure chamber and a plurality of pressure chamber exit orifices defined in the pressure cap. An alignment spacer is defined on the head and interfaces with the pressure cap such that each of the plurality of pressure chamber exit orifices is aligned with a corresponding liquid supply channel exit opening of the plurality of liquid supply channel exit openings. The alignment spacer prevents relative rotation between the head and the pressure cap and space each of the plurality of pressure chamber exit orifices from the corresponding liquid supply channel exit opening of the plurality of liquid supply channel exit openings.

19 Claims, 16 Drawing Sheets

(56) References Cited

U.S. PATENT DOCUMENTS

| | | | |
|---|---|---|---|
| 5,170,942 A * | 12/1992 | Spink | B05B 7/0458 239/427 |
| 5,429,279 A | 7/1995 | Van Der Heijden | |
| 5,452,857 A * | 9/1995 | Furuse | F23D 11/105 239/405 |
| 5,649,649 A | 6/1997 | Marelli | |
| 6,116,516 A | 9/2000 | Ganan-Calvo | |
| 6,119,953 A | 9/2000 | Ganan-Calvo | |
| 6,174,469 B1 | 1/2001 | Ganan-Calvo | |
| 6,187,214 B1 | 2/2001 | Ganan-Calvo | |
| 6,189,803 B1 | 2/2001 | Ganan-Calvo | |
| 6,196,525 B1 | 3/2001 | Ganan-Calvo | |
| 6,197,835 B1 | 3/2001 | Ganan-Calvo | |
| 6,234,402 B1 | 5/2001 | Ganan-Calvo | |
| 6,241,159 B1 | 6/2001 | Ganan-Calvo | |
| 6,248,378 B1 | 6/2001 | Ganan-Calvo | |
| 6,299,145 B1 | 10/2001 | Ganan-Calvo | |
| 6,347,899 B1 | 2/2002 | Vierboom | |
| 6,357,670 B2 | 3/2002 | Ganan-Calvo | |
| 6,386,463 B1 | 5/2002 | Ganan-Calvo | |
| 6,394,429 B2 | 5/2002 | Ganan-Calvo | |
| 6,405,936 B1 | 6/2002 | Ganan-Calvo | |
| 6,432,148 B1 | 8/2002 | Ganan-Calvo | |
| 6,450,189 B1 | 9/2002 | Ganan-Calvo | |
| 6,464,886 B2 | 10/2002 | Ganan-Calvo | |
| 6,554,202 B2 | 4/2003 | Ganan-Calvo | |
| 6,557,834 B2 | 5/2003 | Ganan-Calvo | |
| 6,589,579 B2 | 7/2003 | Ganan-Calvo | |
| 6,595,202 B2 | 7/2003 | Ganan-Calvo | |
| 6,758,067 B2 | 7/2004 | Ganan-Calvo | |
| 6,792,940 B2 | 9/2004 | Ganan-Calvo | |
| 7,059,319 B2 | 6/2006 | Ganan-Calvo | |
| 7,059,321 B2 | 6/2006 | Ganan-Calvo | |
| 7,293,559 B2 | 11/2007 | Ganan-Calvo | |
| 7,341,211 B2 | 3/2008 | Ganan-Calvo | |
| D577,100 S | 9/2008 | Brown | |
| 7,854,353 B2 | 12/2010 | Schmitz | |
| 8,006,916 B2 | 8/2011 | Metcalf | |
| 8,201,351 B2 | 6/2012 | Ganan-Calvo | |
| 8,505,775 B2 | 8/2013 | Bodet | |
| 8,733,343 B2 | 5/2014 | Ganan-Calvo | |
| 8,800,824 B2 | 8/2014 | Ganan-Calvo | |
| 8,881,956 B2 | 11/2014 | Ganan-Calvo | |
| 9,120,109 B2 | 9/2015 | Ganan-Calvo | |
| 2004/0065322 A1 | 4/2004 | Ganan-Calvo | |
| 2005/0116070 A1 | 6/2005 | Ganan-Calvo | |
| 2006/0169800 A1 | 8/2006 | Rosell | |
| 2007/0063072 A1 | 3/2007 | Ganan-Calvo | |
| 2007/0102533 A1 | 5/2007 | Rosell | |
| 2008/0053431 A1 | 3/2008 | Ganan-Calvo | |
| 2008/0053436 A1 | 3/2008 | Rosell | |
| 2008/0054100 A1 | 3/2008 | Rosell | |
| 2008/0271350 A1 | 11/2008 | Ganan-Calvo | |
| 2009/0214655 A1 | 8/2009 | Ganan-Calvo | |
| 2009/0215154 A1 | 8/2009 | Ganan-Calvo | |
| 2011/0045425 A1 | 2/2011 | Agrawal | |
| 2012/0292406 A1 | 11/2012 | Ganan-Calvo | |
| 2013/0221122 A1 | 8/2013 | Ganan-Calvo | |

FOREIGN PATENT DOCUMENTS

| | | |
|---|---|---|
| AU | 743440 | 1/2002 |
| AU | 1572699 | 3/2002 |
| AU | 1572799 | 3/2002 |
| AU | 1572899 | 3/2002 |
| AU | 1572999 | 3/2002 |
| AU | 1573099 | 3/2002 |
| AU | 1573199 | 3/2002 |
| AU | 1575999 | 3/2002 |
| AU | 5934602 | 3/2003 |
| AU | 767486 | 11/2003 |
| AU | 2004267110 | 3/2005 |
| AU | 784815 | 6/2006 |
| AU | 2006209366 | 10/2006 |
| CA | 2254969 | 11/1997 |
| CA | 2314918 | 6/1999 |
| CA | 2314919 | 6/1999 |
| CA | 2314920 | 6/1999 |
| CA | 2314979 | 6/1999 |
| CA | 2315048 | 6/1999 |
| CA | 2315108 | 6/1999 |
| CA | 2315121 | 6/1999 |
| CA | 2374232 | 12/2000 |
| CA | 2536452 | 3/2005 |
| CN | 104507819 | 4/2015 |
| DE | 69806504 | 2/2003 |
| DE | 69714583 | 4/2003 |
| EP | 0008109 | 2/1980 |
| EP | 0899017 | 3/1999 |
| EP | 1037713 | 6/1999 |
| EP | 1039971 | 6/1999 |
| EP | 1037713 | 9/2000 |
| EP | 1039971 | 10/2000 |
| EP | 1192009 | 12/2000 |
| EP | 1192009 | 1/2003 |
| EP | 1293259 | 3/2003 |
| EP | 02027770 | 3/2003 |
| EP | 1479446 | 11/2004 |
| EP | 1663499 | 3/2005 |
| EP | 1813352 | 8/2007 |
| EP | 1839760 | 10/2007 |
| EP | 1842584 | 10/2007 |
| EP | 1880762 | 1/2008 |
| EP | 2819928 | 9/2013 |
| EP | 2819931 | 9/2013 |
| EP | 2819932 | 9/2013 |
| EP | 13754941 | 1/2015 |
| EP | 13755178 | 1/2015 |
| EP | 13755917 | 1/2015 |
| EP | 2842635 | 3/2015 |
| ES | 2140998 | 3/2000 |
| ES | 2158741 | 9/2001 |
| ES | 2180405 | 2/2003 |
| ES | 2190897 | 8/2003 |
| ES | 2199048 | 2/2004 |
| ES | 2229829 | 4/2005 |
| ES | 2245899 | 1/2006 |
| ES | 2250007 | 4/2006 |
| ES | 2255349 | 6/2006 |
| ES | 2257968 | 8/2006 |
| ES | 2264289 | 12/2006 |
| ES | 2264608 | 1/2007 |
| ES | 2265259 | 2/2007 |
| ES | 2265270 | 2/2007 |
| ES | 2272168 | 4/2007 |
| ES | 2272169 | 4/2007 |
| ES | 2273572 | 5/2007 |
| ES | 2275425 | 6/2007 |
| ES | 2277707 | 7/2007 |
| ES | 2281985 | 10/2007 |
| ES | 2283158 | 10/2007 |
| ES | 2310967 | 1/2009 |
| ES | 2350208 | 1/2011 |
| ES | 2444021 | 2/2014 |
| ES | 2520565 | 11/2014 |
| GB | 1109286 | 4/1968 |
| GB | 2209805 | 5/1989 |
| JP | 2004000904 | 1/2004 |
| JP | 2004268037 | 9/2004 |
| JP | 2005206158 | 8/2005 |
| JP | 2007513745 | 5/2007 |
| JP | 2008509459 | 3/2008 |
| JP | 2008538192 | 10/2008 |
| JP | 2008514414 | 9/2009 |
| JP | 2009209751 | 9/2009 |
| PT | 1479446 | 7/2008 |
| WO | WO9743048 | 11/1997 |
| WO | WO9930812 | 6/1999 |
| WO | WO9930831 | 6/1999 |
| WO | WO9930832 | 6/1999 |
| WO | WO9930833 | 6/1999 |
| WO | WO9930834 | 6/1999 |
| WO | WO9930835 | 6/1999 |

(56) References Cited

FOREIGN PATENT DOCUMENTS

| WO | WO9931019 | 6/1999 |
|----|-----------|--------|
| WO | WO0076673 | 12/2000 |
| WO | WO0247744 | 6/2002 |
| WO | WO2003066231 | 8/2003 |
| WO | WO2004065019 | 8/2004 |
| WO | WO2005018817 | 3/2005 |
| WO | WO2005086562 | 9/2005 |
| WO | WO2005087673 | 9/2005 |
| WO | WO2006018462 | 2/2006 |
| WO | WO2006037819 | 4/2006 |
| WO | WO2006037823 | 4/2006 |
| WO | WO2006082263 | 8/2006 |
| WO | WO2006089983 | 8/2006 |
| WO | WO2006089984 | 8/2006 |
| WO | WO2006117422 | 11/2006 |
| WO | WO2007003667 | 1/2007 |
| WO | WO2007034013 | 3/2007 |
| WO | WO2013124500 | 8/2013 |
| WO | WO2013130883 | 9/2013 |
| WO | WO2013130896 | 9/2013 |
| WO | WO2013130909 | 9/2013 |

OTHER PUBLICATIONS

U.S. Dept. of Energy, Low-Emissions Burner Technology Using Biomass-Derived Liquid Fuels, Industrial Technologies Program, pp. 1-2.

H. V. Panchasara, Emissions Reductions in Diesel and Kerosene Flames Using a Novel Fuel Injector, Journal of Propulsion and Power, 2009, pp. 984-987.

Vijaykant Sadasivuni, A Novel Meso-Scale Combustion System for Operation with Liquid Fuels, Proceedings of the Combustion Institute, 2009, pp. 3155-3162, Elsevier.

International Search Report for PCT/US20131028424, dated Jun. 14, 2013.

International Search Report for PCT/US2013/028443, dated Jun. 14, 2013.

International Search Report for PCT/US2013/028461, dated Jun. 14, 2013.

J.D. O'Keefe, Supersonic Liquid Jets, Nature, Jan. 7, 1967, pp. 23-25, Nature Publishing Group.

A. Matthujak, High Speed Jet Formation by Impact Acceleration Method, Shock Waves, 2007, pp. 405-419, Springer.

\* cited by examiner

MULTI-ORIFICE NOZZLE FOR DROPLET ATOMIZATION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to nozzle devices and methods for creating atomized sprays to provide greater coverage in dispensing liquids. More particularly, the present disclosure relates to a multi-orifice nozzle and associated components for droplet atomization.

Devices for dispensing liquids are generally known in the art. The dispensing of liquids may be used in a variety of settings in which a liquid is to be applied to a target object. One such scenario includes the treatment of seeds with chemical agents, including antimicrobials, fungicides, insecticides, coloring agents, fertilizer, growth promoters, etc.

Conventional devices introduce a chemical agent to the seeds while the seeds are being agitated in order to provide greater coverage of the chemical agent across the seeds. A portion of the seeds are exposed directly to the chemical agent. This may occur by direct contact when the chemical agent is dispensed from a source (such as by manual introduction or through a hose). As the seeds are agitated, the remaining seeds may be exposed to the chemical agent indirectly. The chemical agent may transfer from seed to seed or from the container which has excess chemical agents until all of the seeds have been exposed to the chemical agent.

The method of agitating seeds until the chemical agent is spread across the entire load of seeds can be inefficient and ineffective at properly treating a batch of seeds. For example, the seeds may be treated with the chemical agent disproportionately, leaving some seeds effectively untreated and other seeds over treated. Further, the agitation process may damage some of the seeds if the process occurs for too long or if the agitation is too rough in order to achieve ubiquitous and even coverage. Thus, these methods may necessitate a balance between treatment coverage and maintaining the integrity of the seed.

Seed treaters may also find this problem particularly difficult when high volumes of seeds are to be treated. On an industrial scale, the balance between effective coverage and efficient processes with high yield is crucial.

Another difficulty associated with the dispensing of chemical agents onto seeds includes the varying viscosities and densities of the variety of chemicals used. Certain chemicals may be prone to clogging liquid feeders where others may be prone to fast and uncontrolled dispensing and dispersion.

What is needed then are improvements in liquid dispensers, nozzles, and methods for delivery of liquid products in the form of atomized sprays.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In some embodiments, the present disclosure provides a device for spraying liquid droplets onto seeds. The device includes a seed treatment chamber and at least one multi-orifice nozzle positioned to spray liquid droplets onto seeds residing inside the chamber. The seeds may be circulated mechanically inside the chamber during spray. The multi-orifice nozzle provides enhanced liquid droplet atomization for applying the liquid onto the seeds inside the chamber.

One aspect of the disclosure is a multi-orifice nozzle for droplet atomization. The multi-orifice nozzle may include a head defining an exterior head surface, the head having a plurality of liquid supply channels and a plurality of liquid supply channel entrance openings. The head may also have a plurality of liquid supply channel exit openings such that liquid enters the plurality of liquid supply channels at the liquid supply channel entrance openings and exits the plurality of liquid supply channels at the liquid supply channel exit openings. The multi-orifice nozzle may also comprise a pressure cap positioned proximate the head, the pressure cap defining a pressure chamber and a plurality of pressure chamber exit orifices defined in the pressure cap downstream of the plurality of liquid supply channel exit openings. Thus, gas passing through the pressure chamber toward the plurality of pressure chamber exit orifices may travel past the plurality of liquid supply channel exit openings. The multi-orifice nozzle may also include an alignment spacer defined on the head, wherein the alignment spacer interfaces with the pressure cap such that each of the plurality of pressure chamber exit orifices is aligned with a corresponding liquid supply channel exit opening of the plurality of liquid supply channel exit openings. The alignment spacer may prevent relative rotation between the head and the pressure cap and space each of the plurality of pressure chamber exit orifices from the corresponding liquid supply channel exit opening of the plurality of liquid supply channel exit openings.

Another aspect of the disclosure includes a liquid dispensing apparatus for droplet atomization including a dispensing body having a receiving end and a dispensing end, the dispensing body including a liquid duct and a gas duct defined in the dispensing body. The liquid dispensing apparatus may further include a head positioned proximate the dispensing end of the dispensing body. The head may include a plurality of liquid supply channels and a plurality of liquid supply channel exit openings such that liquid travelling from the liquid duct toward the plurality of liquid supply channel exit openings passes through the plurality of liquid supply channels. The liquid dispensing apparatus may further include a pressure cap positioned proximate the dispensing end of the dispensing body and exterior the head relative to the dispensing body, the pressure cap defining a pressure chamber, the pressure chamber being in fluid communication with the gas duct. The liquid dispensing apparatus may further comprise a plurality of pressure chamber exit orifices defined in the pressure cap and aligned with the plurality of liquid supply channel exit openings such that gas passing from the gas duct toward the plurality of pressure chamber exit orifices travels past the plurality of liquid supply channel exit openings. The liquid dispensing apparatus may also include an alignment spacer on the head, the alignment spacer operable to interface with the pressure cap such that each of the plurality of pressure chamber exit orifices is aligned with a corresponding liquid supply channel exit opening of the plurality of liquid supply channel exit openings. The alignment spacer may axially space each of the plurality of pressure chamber exit orifices from the corresponding liquid supply channel exit opening of the plurality of liquid supply channel exit openings.

Another aspect may include a method of atomizing a liquid. The method may include providing a liquid to a liquid duct in a dispensing body and providing a gas to a gas duct in the dispensing body. The method may further include introducing the liquid into a head via a plurality of liquid duct channels, the head positioned proximate the dispensing body. The method may also comprise introducing the gas into a pressure chamber of a pressure cap, the pressure cap positioned proximate the dispensing body such that the head is positioned between the pressure cap and the dispensing body and expelling the gas through a plurality of pressure cap orifices, the pressure cap orifices positioned proximate a plurality of liquid supply channel exit openings. The method may also include dispensing the liquid from the liquid supply channel exit openings and through the pressure cap orifices, such that the liquid and the gas interact and form atomized droplets of the liquid.

In some embodiments, the present disclosure provides a device for spraying seeds. The device includes a multi-orifice nozzle positioned inside a chamber, wherein the multi-orifice nozzle is configured to provide flow blurring atomization of a liquid to be sprayed onto the seeds.

Numerous other objects, advantages, and features of the present disclosure will be readily apparent to those of skill in the art upon a review of the following drawings and description of a preferred embodiment.

DETAILED DESCRIPTION

Figure 1:
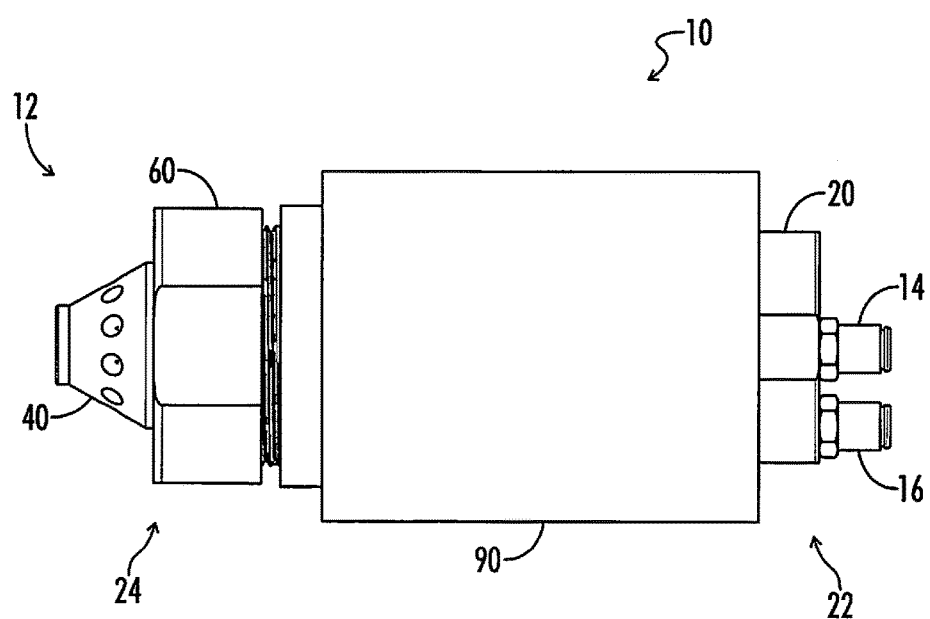
FIG. 1 is a side view of an exemplary embodiment of a liquid dispensing apparatus.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

A liquid dispensing apparatus 10 is generally provided for droplet atomization. Liquids may be atomized by the liquid dispensing apparatus 10 in order to break up a liquid substance while dispensing the liquid onto a surface. Referring to the drawings, FIG. 1 illustrates an exemplary embodiment of a liquid dispensing apparatus 10. The liquid dispensing apparatus 10 generally includes a nozzle 12 in fluid communication with a liquid inlet 14 and a gas inlet 16. A liquid substance and gas may pass into the liquid dispensing apparatus 10 through the liquid inlet 14 and the gas inlet 16 respectively. The liquid substance and gas may then pass out of the liquid dispensing apparatus 10 through the nozzle 12 such that the liquid substance exits the liquid dispensing apparatus 10 as fine particles (atomized).

Figure 2:
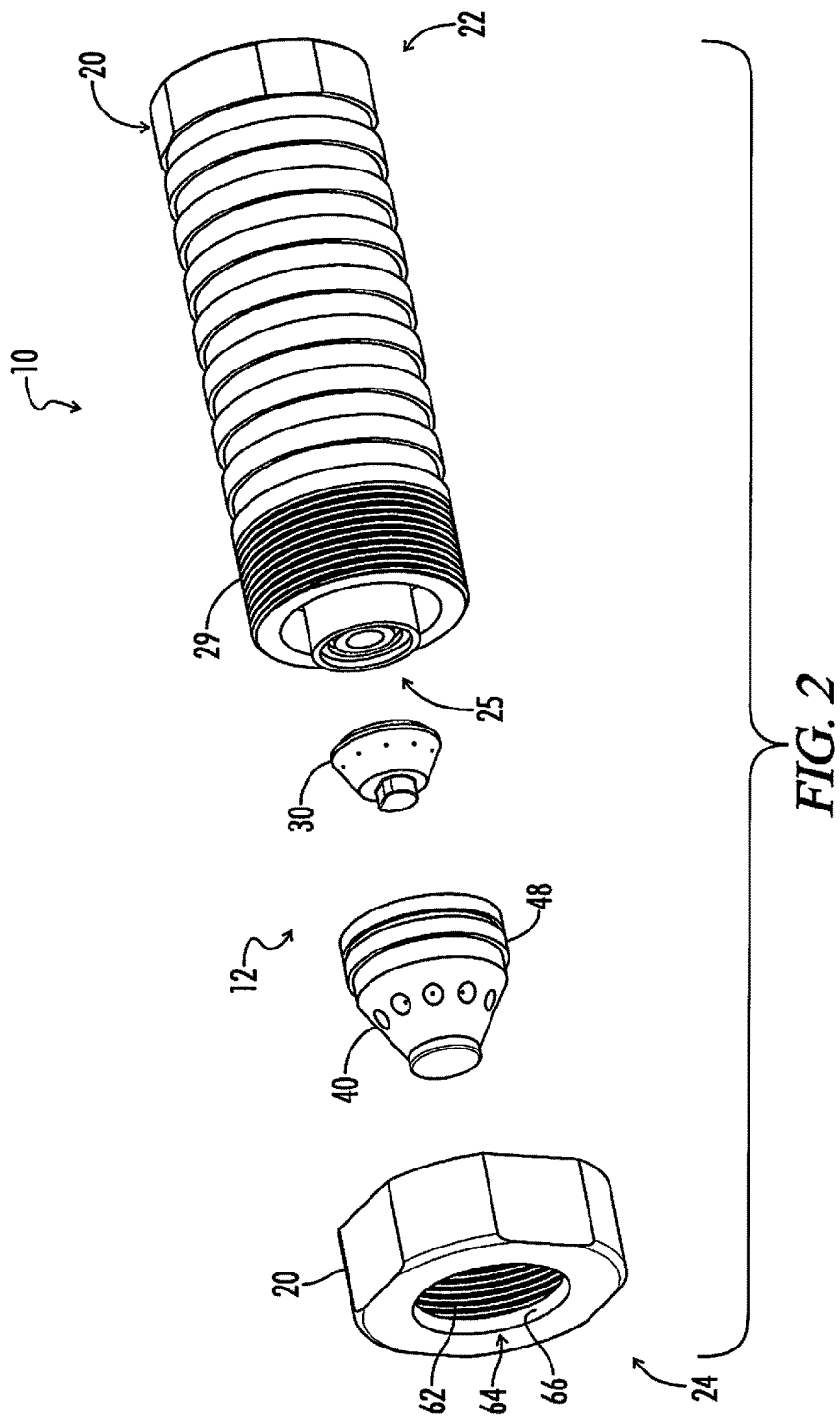
FIG. 2 is an exploded perspective view of an exemplary embodiment of a liquid dispensing apparatus.
Figure 3:
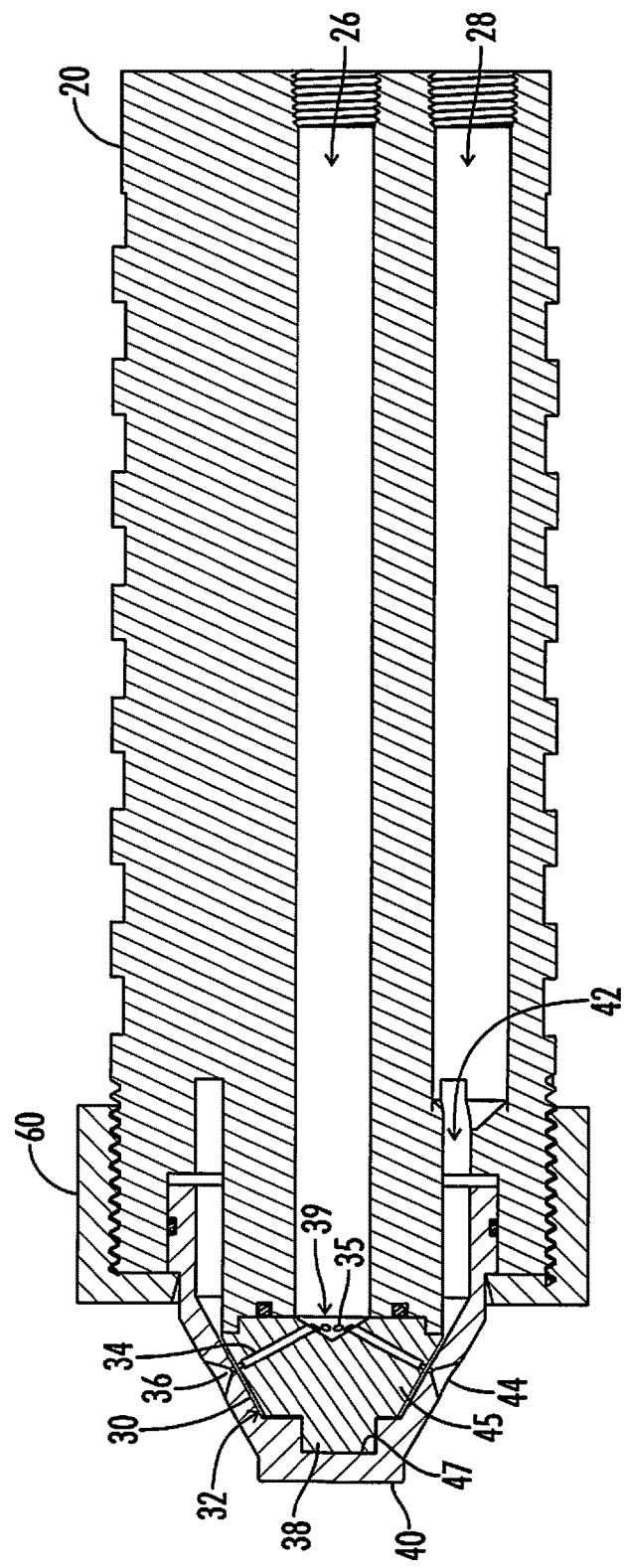
FIG. 3 is a sectional side view of an exemplary embodiment of a liquid dispensing apparatus.
Figure 4:
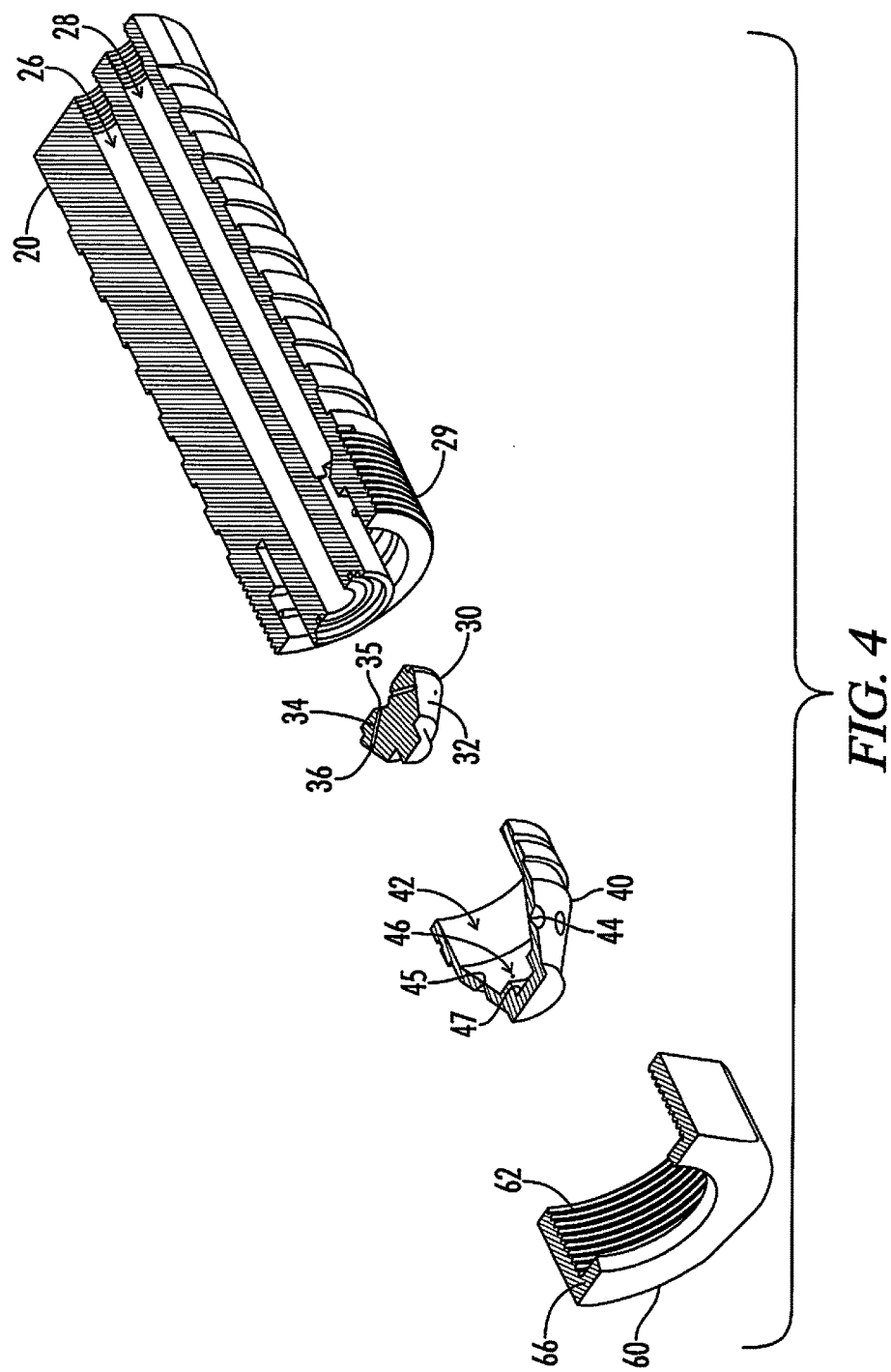
FIG. 4 is an exploded sectional perspective view of an exemplary embodiment of a liquid dispensing apparatus including a multi-orifice nozzle comprising a pressure cap and a head.
Figure 5A:
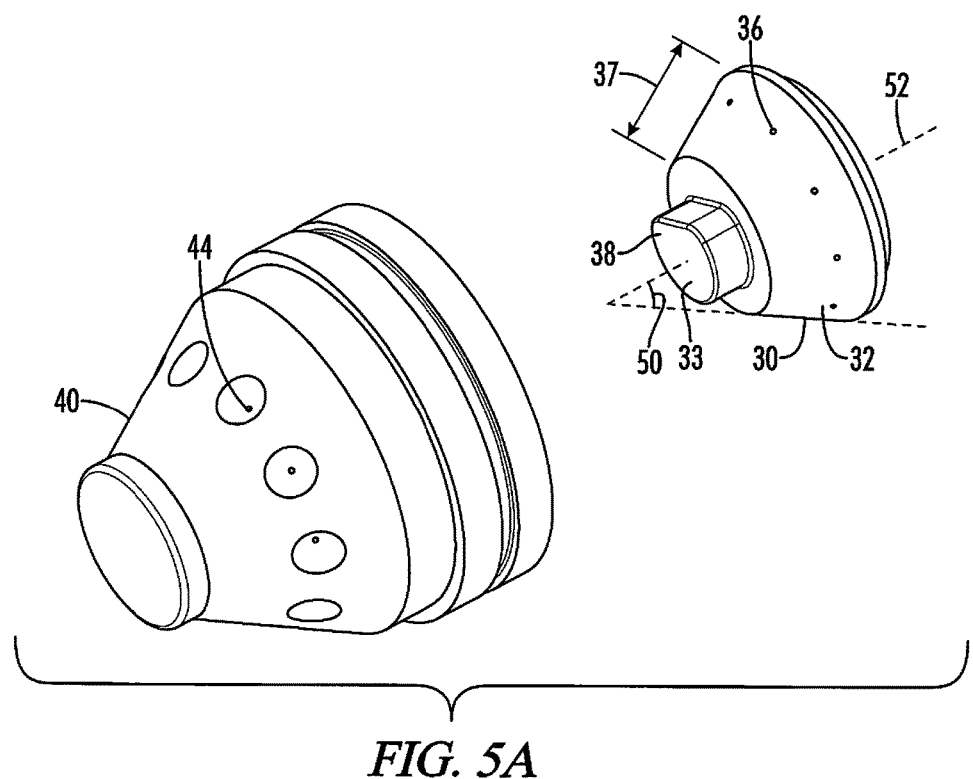
FIGS. 5A and 5B are perspective views of exemplary embodiments of a multi-orifice nozzle.
Figure 5B:
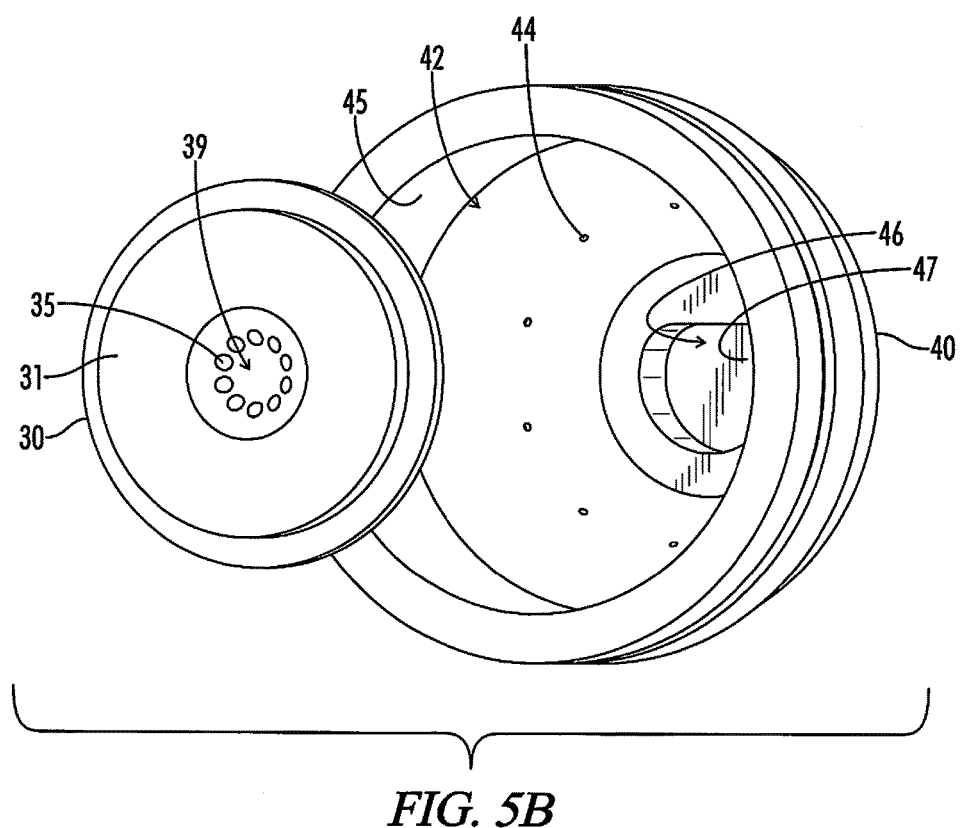

Now referring to FIGS. 2-4, a liquid dispensing apparatus 10 is provided in greater detail. In one embodiment, the liquid dispensing apparatus 10 may comprise a dispensing body 20 having a receiving end 22, a dispensing end 24, a liquid duct 26, and a gas duct 28. The liquid duct 26 and the gas duct 28 may be defined in the dispensing body 20 from the receiving end 22 to the dispensing end 24.

The liquid dispensing apparatus 10 may further comprise a nozzle 12. The nozzle 12 may be integrated onto the dispensing body 20 or may be a separate component. FIGS. 2-4 demonstrate an exemplary embodiment in which the nozzle 12 comprises a head 30 positioned proximate the dispensing body 20 at the dispensing end 24 and a pressure cap 40. The pressure cap 40 may be positioned proximate the dispensing end 24 of the dispensing body 20 and exterior the head 30 relative to the dispensing body 20. Thus, the head 30 may be positioned between the dispensing body 20 and the pressure cap 40 when assembled.

When the nozzle 12 is discrete from the dispensing body 20, the liquid dispensing apparatus 10 may further comprise a pressure cap fastener 60. The pressure cap fastener 60 may include threads 62 for engaging corresponding threads 29 on the dispensing body 20. The pressure cap fastener 60 may also define a pressure cap opening 64 through which a portion of the pressure cap 40 may extend when the pressure cap fastener 60 is retaining the pressure cap 40 proximate the dispensing body 20. The pressure cap fastener 60 may include a collar 66, the collar 66 operable to retain a lip 48 of the pressure cap 40 with substantially even pressure around the collar 66, such that a pressure chamber 42 is maintained between the pressure cap 40 and the head 30 when coupled together.

Referring still to FIGS. 2-4, the head 30 may include an interior head surface 31 and an exterior head surface 32. The head 30 may further comprise a plurality of liquid supply channels 34, which span the head 30 from the interior head surface 31 to the exterior head surface 32. When the head is positioned proximate the dispensing end 24 of the dispensing body 20, the liquid supply channels 34 are in fluid communication with the liquid duct 26. Thus, a liquid substance may enter the liquid supply channels 34 from the liquid duct 26 and pass through the head 30. The head 30 may further comprise a plurality of liquid supply channel exit openings 36, which are positioned on the exterior head surface 32.

Referring still to FIGS. 2-4, the pressure cap 40 may define a pressure chamber 42. The pressure chamber 42 may be in fluid communication with the gas duct 28. The pressure cap 40 may further comprise a plurality of pressure chamber exit orifices 44 defined in the pressure cap 40. When the pressure cap 40 is positioned exterior the head 30, the pressure chamber exit orifices 44 may be aligned with the liquid supply channel exit openings 36 such that gas passing from the gas duct 28 toward the pressure chamber exit orifices 44 travels past the liquid supply channel exit openings 36. The pressure chamber 42 will be discussed in further detail below.

The head 30 may further comprise an alignment spacer 38. The alignment spacer 38 may be operable to interface with the pressure cap 40 such that each of the pressure chamber exit orifices 44 is aligned with a corresponding liquid supply channel exit opening of the liquid supply channel exit openings 36. The alignment spacer 38 may further be operable to axially space each of the pressure chamber exit orifices 44 from a corresponding liquid supply channel exit opening 36. When the liquid supply channel exit openings 36 are aligned with and axially spaced from the pressure chamber exit orifices 44, a liquid substance that is exiting the liquid supply channel exit openings 36 is disrupted by gas moving from the pressure chamber 42 and through the pressure chamber exit orifices 44. The interaction of the gas and the liquid substance results in the disruption of the interaction between liquid particles such that smaller units of the liquid substance are expelled from the liquid dispensing apparatus 10. The alignment spacer 38 may also be operable to prevent the relative rotation between the head 30 and the pressure cap 40, such that the liquid supply channel exit openings 36 and the pressure chamber exit orifices 44 remain in alignment.

In some embodiments, the pressure cap 40 may include an alignment spacer receiver 46, the alignment spacer receiver 46 operable to receive and retain the alignment spacer 38 of the head 30. As seen in FIGS. 5A and 5B, the alignment spacer 38 may include a D-shaped protrusion. The D-shaped protrusion may correspond to a D-shaped recess of the alignment spacer receiver 46. The D-shape of the alignment spacer 38 and the alignment spacer receiver 46 provide mechanical interference such that the head 30 and the pressure cap 40 are prevented from axially rotating with respect to each other. Various other shapes may be implemented to provide the alignment and anti-rotation features of the head 30 and pressure cap 40, including non-circular shaped alignment spacers 38.

In other embodiments, the alignment spacer 38 further comprises a distal surface 33 and the alignment spacer receiver 46 further comprises a back wall 47. When the alignment spacer receiver 46 retains the alignment spacer 38, the distal surface 33 of the alignment spacer 38 is in contact with the back wall 47 of the pressure cap 40. When the distal surface 33 of the alignment spacer 38 and the back wall 47 are in contact, the frustum-shaped portion 37 of the head 30 is axially spaced from the inner wall 41 of the pressure cap 40. Thus, when the head 30 is positioned adjacent the pressure cap 40, the pressure chamber 42 is maintained (See FIGS. 6-8).

With further reference to FIGS. 5A and 5B, the head may define an exterior head surface 32 including a frustum-shaped portion 37. The liquid supply channel exit openings 36 may be spaced on the frustum-shaped portion 37 of the exterior head surface 32. The placement of the liquid supply channel exit openings 36 on the frustum-shaped portion 37 permits the nozzle 12 to maintain a wider spray distribution of the liquid substance. The frustum-shaped potion 37 may be formed such that a conic angle 50 may provide a specific distribution pattern that is desirable. The conic angle 50 is the angle defined between a head axis 52 about which the head 30 is disposed and the exterior surface of the frustum-shaped portion 37 of the head 30. For a tighter spray distribution, the conic angle may approach 90 degrees. For a wider spray distribution, the conic angle 50 may approach 0 degrees.

With further reference to FIGS. 5A and 5B, the head 30 may include the liquid supply channel exit openings 36 spaced along a frustum-shaped potion 37 of the head 30. The liquid supply channel exit openings 36 may be spaced to provide a spray distribution in 360 degrees around the head axis 52. The number of liquid supply channel exit openings 36 may include anywhere from two to thirty liquid supply channel exit openings 36. In some embodiments, the head 30 includes three to fifteen liquid supply channel exit openings 36. In other embodiments, the head 30 comprises ten liquid supply channel exit openings 36 spaced equally along the frustum-shaped potion 37 of the head 30. The liquid supply channel exit openings 36 may be positioned on the frustum-shaped portion 37 of the head 30 in a single plane, the single plane disposed perpendicularly to the head axis 52.

Referring to FIGS. 5B and 6, the head 30 may further define a loading chamber 39. The loading chamber 39 may be a recess on the interior head surface 31. A plurality of liquid supply channel entrance openings 35 may be positioned adjacent to the loading chamber 39, the liquid supply channel entrance openings 35 operable to permit liquid substances to pass from the liquid duct 26 into the liquid supply channels 34. The loading chamber 39 may include a variety of configurations including conical shape, semispherical shape, and other configurations known to one of skill in the art. The loading chamber 39 may allow for the liquid substance to pool and stage prior to passing into the liquid supply channels 34. All of the liquid supply channels 34 may be fed from the loading chamber 39.

In other embodiments, the liquid supply channels 34 may be fed directly from the liquid duct 26 or a loading chamber 39 may be formed between the head 30 and the dispensing body 20. In those embodiments in which the head 30 is integrated onto the dispensing body 20, the loading chamber 39 may be a distinct portion defined in the dispensing body 20.

Figure 7:
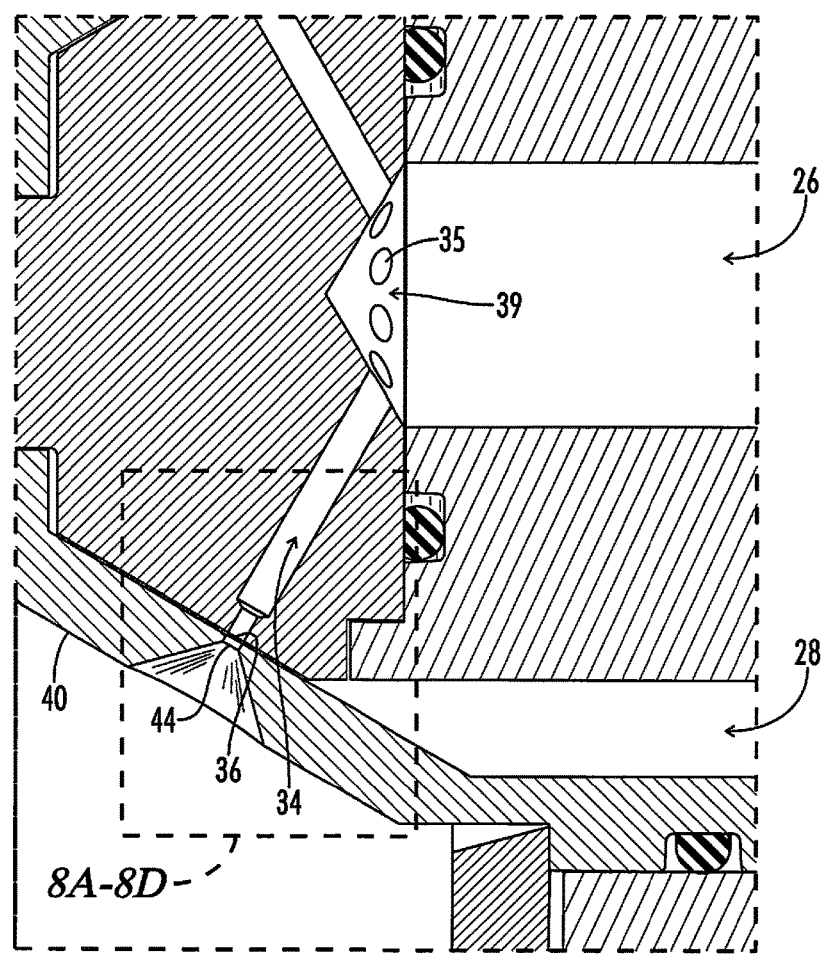
FIG. 7 is a sectional side view of an exemplary embodiment of a multi-orifice nozzle and an interface between the pressure cap, the head, and the dispensing body.

As can be seen in FIGS. 7 and 8, in some embodiments, the liquid supply channels 34 includes a converging section upstream of the liquid supply channel exit openings 36. The converging section generally provides a reduction in diameter in a downstream direction toward the liquid supply channel exit openings 36. For instance, the liquid supply channels 34 may have a first diameter D at or near the liquid supply channel exit openings 36 and a second diameter $D_2$ at or near the liquid supply channel entrance openings 35. In some embodiments, the second diameter $D_2$ is greater than the first diameter D. In other embodiments, the first diameter D is greater than the second diameter $D_2$. The variation in the diameter of the liquid supply channels 34 may provide certain fluid dynamics, which promote the atomization of the liquid substance.

In some embodiments, the liquid supply channels 34 may be disposed about a plurality of liquid supply channel axes 58 in the head 30 such that the liquid supply channels 34 are perpendicular to the exterior head surface 32. In other embodiments, the liquid supply channel axes 58 are positioned at an angle greater than zero degrees and less than 180 degrees relative to the head axis 52. The distribution area of the atomized liquid may be varied by altering the angle between the liquid supply channel axes 58 and the head axis 52.

Figure 6:
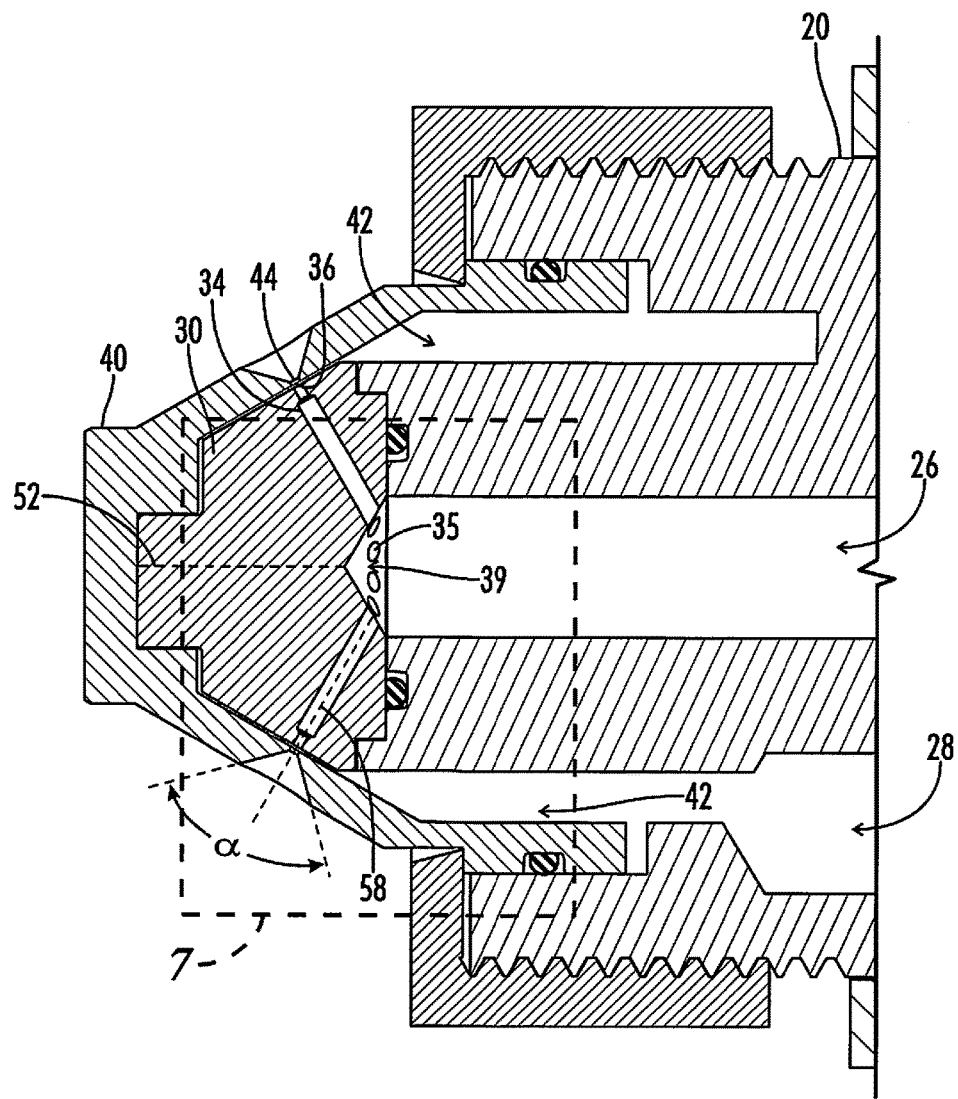
FIG. 6 is a sectional side view of an exemplary embodiment of a multi-orifice nozzle mounted to a dispensing body.

With reference to FIGS. 6-8, the gas duct 28 may be in fluid communication with the pressure chamber 42. As previously discussed, the pressure chamber 42 is maintained between the pressure cap 40 and the dispensing body 20 when the pressure cap 40 is proximate the dispensing body 20. The pressure chamber 40 may be positioned inward from the interior pressure cap end wall 45 such that the pressure chamber 42 is surrounding portions of the dispensing body 20 and the head 30 in 360 degrees. The interior pressure cap end wall 45 can be substantially flat in some embodiments and in other embodiments, the pressure cap end wall 45 may be curved to substantially match the curvature of the frustum-shaped portion 37 of the head 30. In order to maintain an airtight seal between the pressure cap 40 and the dispensing body 20, an O-ring may be positioned between the pressure cap 40 and the dispensing body 20. Thus, a gas entering the pressure chamber 40 from the gas duct 20 may only be exhausted through the pressure chamber exit orifices 44.

Figure 8A:
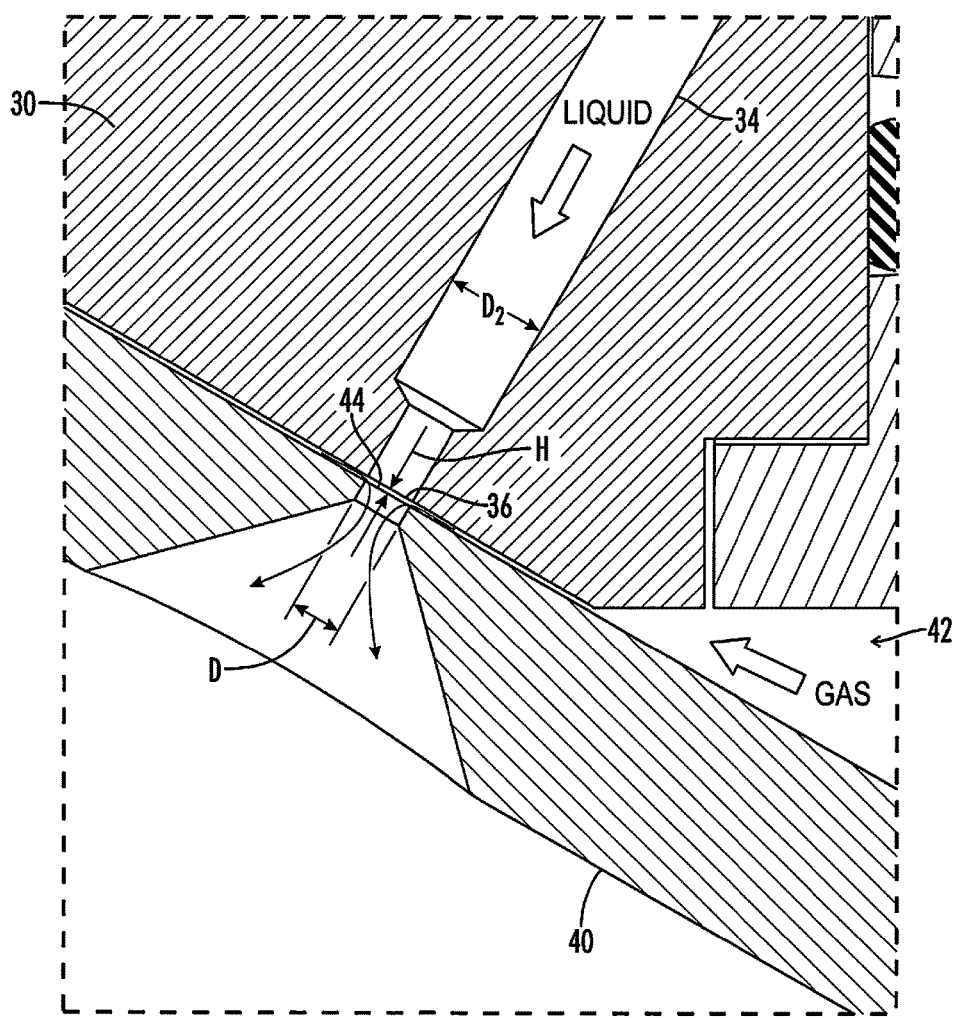
FIG. 8A is a sectional side view of a liquid supply channel, a liquid supply channel exit opening, and a distance H, distance H representing the distance between the liquid supply channel exit opening and a pressure chamber exit orifice.

In some embodiments, the pressure chamber 42 may narrow proximate the pressure chamber exit orifices 44 and the liquid supply channel exit openings 36. The pressure chamber 42 may narrow to a distance of H, as seen in FIG. 8A, between the pressure cap 40 and the head 30, meaning the interior pressure cap end wall 45 is axially offset from the liquid supply channel exit opening 36 by a distance H. The distance H may be maintained by the alignment spacer 38 extending a length which is greater than the depth of the alignment spacer receiver 46. The distance H may be one of the factors that provides the proper physical interaction of the liquid substance and the gas to create the various discharge patterns including flow blurring and flow focusing. For example, the pressure chamber exit orifice 44 may include a pressure chamber exit orifice diameter D. In some embodiments, a nozzle 12 includes a ratio of H divided by D that is less than about 0.25. In various other embodiments, the nozzle 12 includes a ratio of H divided by D of less than about 0.10. The ratio between H and D promote certain interactions between the liquid substance and gas that result in various spray patterns such as flow blurring and flow focusing.

Figure 8B:
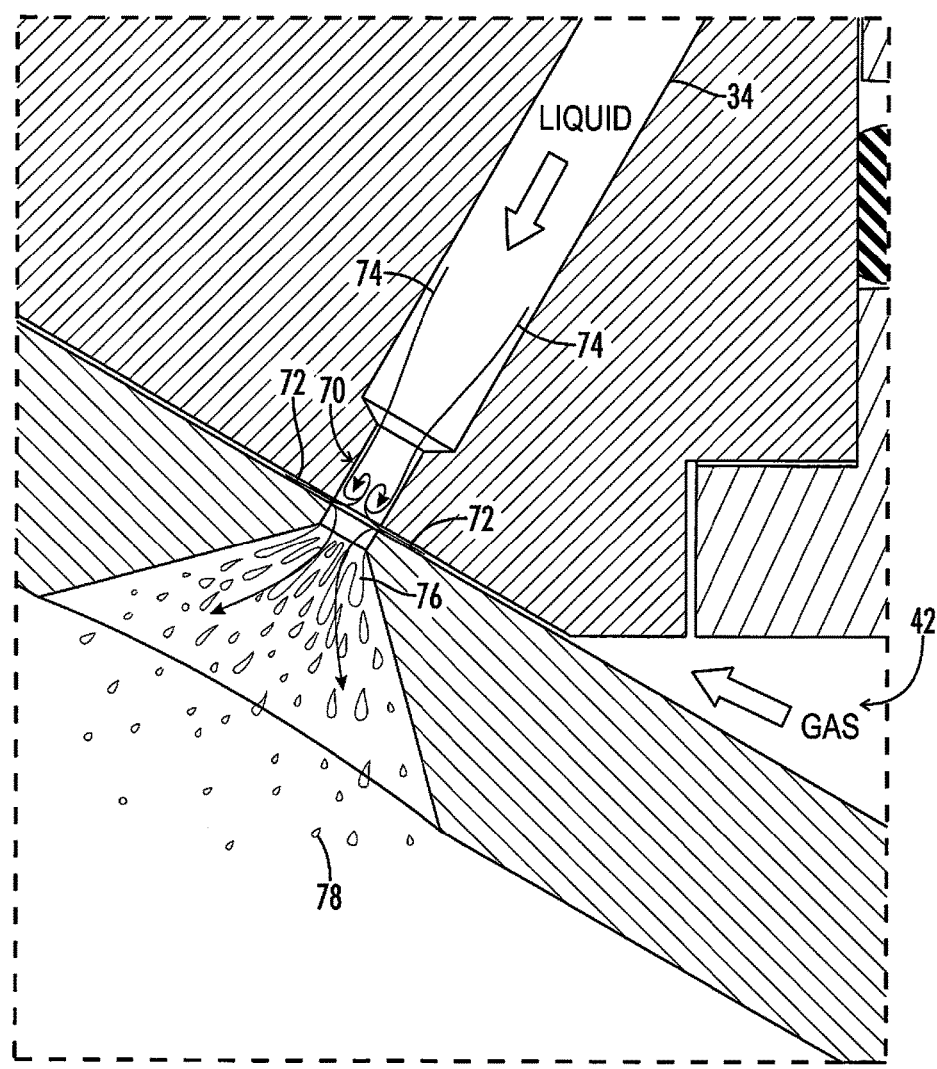
FIG. 8B is a sectional side view of a liquid and a gas interacting at a reflux cell and forming toroidal vortices in the liquid supply channel, resulting in flow blurring of the liquid.

One example of flow blurring is demonstrated in FIG. 8B. In this example, a liquid substance travels through the liquid duct 26, enters the liquid supply channel entrance opening 36 and through the liquid supply channel. A gas travels through the gas duct 28 and into the pressure chamber 42. As the gas moves towards the pressure chamber exit orifice 44 and the liquid supply channel exit opening 36, a portion of the gas enters into the liquid supply channel exit opening 36 and forms toroidal vorticities, thereby providing a desired flow interaction geometry for forming a reflux cell 70 in the liquid supply channels 34. The turbulent interactions of the liquid substance and the gas at the liquid supply channel exit opening 36 overcomes some of the physical interactions of the molecules of the liquid substance, thus allowing the liquid substance to be divided into smaller units forming small droplets of the liquid substance. Other portions of the gas exit through the pressure chamber exit orifice 44. As the gas exits the pressure chamber exit orifice 44, the gas is able to expand and interact with the liquid substance exiting from the liquid supply channel exit opening 36 and the pressure chamber exit orifice 44.

With further reference to FIG. 8B, in some embodiments, a nozzle 12 allows a portion of gas forced through the pressure chamber 42 from the gas duct 16 to flow upstream into the liquid supply channels 34 through the liquid supply channel exit openings 36 and to form a reflux cell 70 with the liquid substance in the liquid supply channels 34 upstream of the liquid supply channel exit openings 36. Formation of a reflux cell 70 is characteristic of a flow blurring interaction between a liquid substance and a gas. The reflux cell 70 includes a region of toroidal vorticity between a propellant gas flow 72 and a liquid product flow 74 inside the liquid supply channels 34. The liquid substance and the gas undergo turbulent interactions, forming one or more discrete bubbles of propellant gas in some flow conditions. A plurality of fluid ligaments 76 may be formed extending from the reflux cell 70 toward the pressure chamber exit orifices 44, and a plurality of atomized droplets 78 are formed downstream of the pressure chamber exit orifices 44. The nozzle 12 may form atomized droplets in a size range of between about 0.5 and about 250 micrometers in some applications.

Figure 8C:
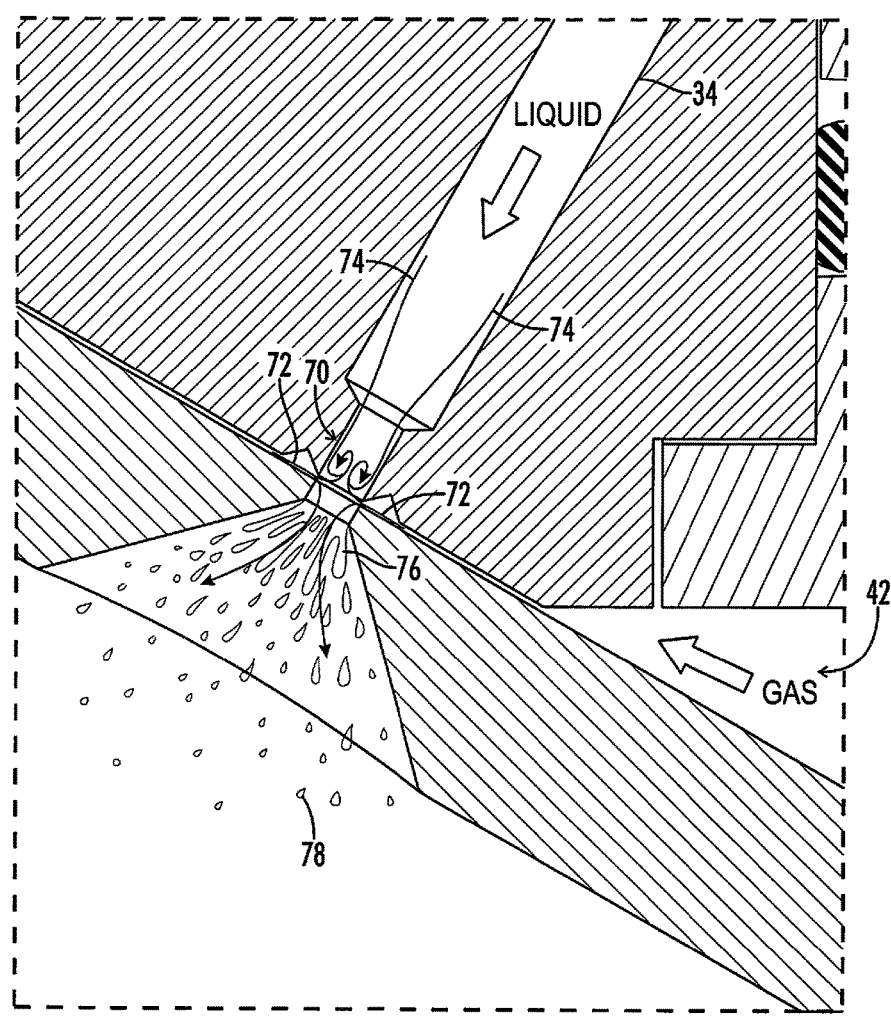
FIG. 8C is a sectional side view of a liquid and gas interacting at a reflux cell resulting in flow blurring, where a liquid supply channel exit opening includes a sharp edge.

As demonstrated in FIG. 8C, in other embodiments, flow blurring may also be accomplished by providing a liquid supply channel exit opening 36 including a side wall disposed at an acute angle, meaning the liquid supply channel exit opening 36 may form a sharp edge. Because the shape of the liquid supply channel exit opening 36 is sharp-edged, gas is able to exit the pressure chamber 42 with little or even no losses by friction. Consistently, the gas will be released at the highest velocity that the essentially adiabatic expansion allows. The sharp edge of the liquid supply channel exit opening 36 may be formed directly in the head 30 such that the pressure chamber 42 extends into the cavity or empty space created by the recess in the head 30 providing the sharp edge. This configuration may be employed around each of the liquid supply channel exit openings 36 such that the liquid substance dispensed from the device 10 is influenced by a substantially similar environment.

Figure 8D:
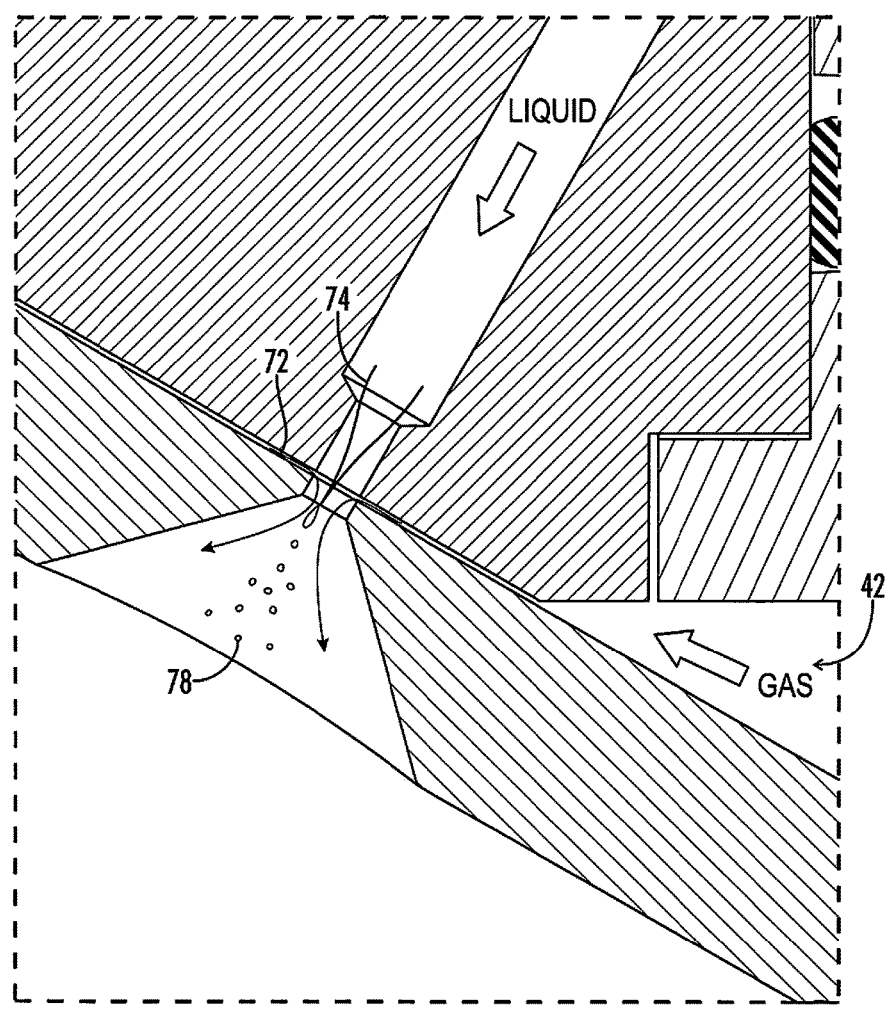
FIG. 8D is a sectional side view of a liquid and a gas interacting at a pressure chamber exit orifice, resulting in flow focusing of the liquid.

FIG. 8D provides an exemplary embodiment in which flow focusing occurs. As gas travels through the pressure chamber 42, the gas exits the pressure chamber exit orifice 44. Liquid substance travelling through the liquid supply channel 34 and out through both the liquid supply channel exit opening 36 and the pressure chamber exit orifice 44 is disrupted by the gas flowing out. Thus, the liquid substance is broken up into small droplets.

In both flow focusing and flow blurring, the interactions may occur at each of the plurality of pressure chamber exit orifices 44 and liquid supply channel exit openings 36. Thus, the liquid dispensing apparatus 10 is providing an atomized liquid substance in 360 degrees around the nozzle 12.

Likewise, as can be seen in FIGS. 6-8, in some embodiments, the pressure chamber exit orifices 44 may include a diverging section downstream from the pressure chamber 42 and liquid supply channels 34. The diverging section generally provides an increase in diameter in a downstream direction. The diverging section may provide a wide field for the expansion of the gas and the dispersion of the fluid ligaments 76 and atomized droplets 78 for droplet formation. For example, the pressure chamber exit orifices 44 may comprise a substantially conical recess where the conic angle α is in the range of 145 degrees and 45 degrees. In one example, the conic angle α is about ninety degrees. As the gas expands and the liquid substance is atomized, the fluid dispersion may be controlled or limited by the pressure chamber exit orifices 44. In those embodiments in which the fluid dispersion is to be controlled, the conic angle α of the pressure chamber exit orifices 44 may be narrower and in those embodiments where a wide dispersion is sought, a wider conic angle α of the pressure chamber exit orifices 44 may be implemented.

Referring again to FIGS. 2 and 3, when the nozzle 12 is discreet from the dispensing body 20, the dispensing body 20 may form nozzle-receiving portions 25 on the dispensing end 24. The nozzle-receiving portions 25 may correspond to structural features of the nozzle 12. For example, when the head 30 is placed adjacent the dispensing body 20, the nozzle-receiving portion 25 is shaped to receive the head 30 such that the liquid supply channel entrance openings 36 are in fluid communication with the liquid duct 26. Furthermore, the dispensing body 20 may include an O-ring to prevent the liquid substance from passing out from between the nozzle-receiving portion 25 of the dispensing body and the head 30. Thus, liquid substance flows only along the desired flow path.

Figure 9:
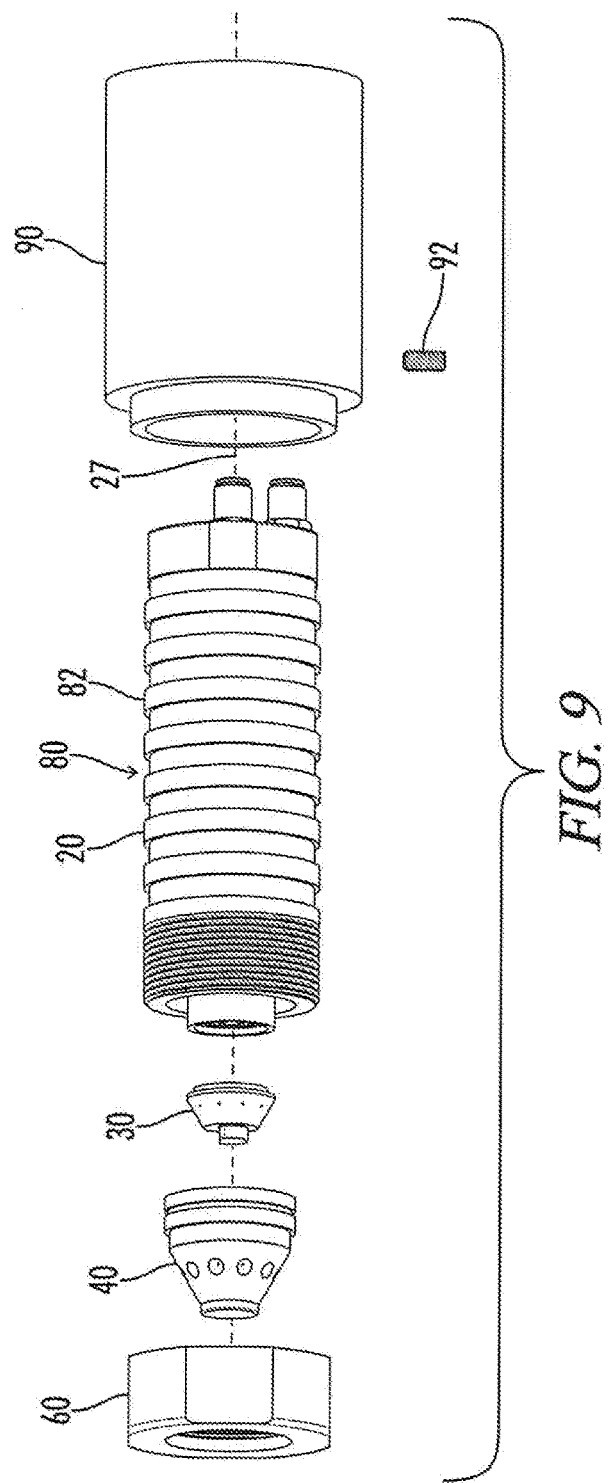
FIG. 9 is an exploded perspective view of an exemplary embodiment of a multi-orifice nozzle with an exemplary holder sleeve.
Figure 10:
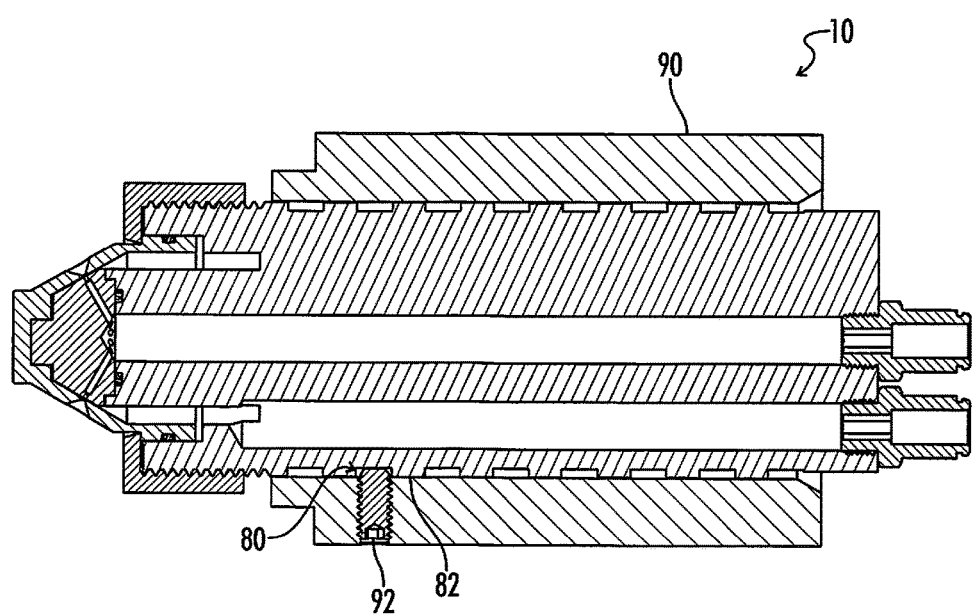
FIG. 10 is a sectional side view of exemplary embodiment of a multi-orifice nozzle with exemplary holder sleeve and exemplary dispensing body.

Now referring to FIG. 9, the liquid dispensing apparatus 10 further comprises a holder sleeve 90. The holder sleeve 90 is configured to slide over and receive the dispensing body 20. The holder sleeve 90 may be retained in a permanent or semi-permanent position on various assemblies, including a seed treating assembly (See FIG. 11). The holder sleeve 90 may form an interior channel 92 shaped to receive the dispensing body 20 such that the nozzle 12 extends outward from the interior channel 92 when the dispensing body 20 is retained by the holder sleeve 90. The dispensing body 20 may move relative to the holder sleeve 90, such that the spray distance may be adjusted according to a desired length.

In some embodiments, the dispensing body 20 may include a plurality of recesses 80 axially spaced along exterior portions of the dispensing body 20. The recesses 80 may be axially spaced along the dispensing body 20. In some embodiments, the recesses 80 may extend about the exterior surface of the dispensing body 20. The dispensing body 20 may be disposed about a dispensing body axis 27 and the recesses 80 may be positioned along the dispensing body 20 such that the recesses 80 are transverse to the dispensing body axis 27. The liquid dispensing apparatus 10 may further comprise a set fastener 92, which is operable to selectively retain the dispensing body 20 in the holder sleeve 90 at an adjustable position via one of the recesses 80. The set fastener 92 may include a screw such that when the set fastener 92 is advanced through the holder sleeve 90, the set fastener 92 mechanically interferes with the sidewalls of the recesses 80 and prevents the advancing or retreat of the dispensing body 20 relative to the holder sleeve 90.

In some embodiments, the recesses 80 may be formed between ridges 82 protruding from the surface of the dispensing body 20. The ridges 82 may be axially spaced along the dispensing body 20 such that a recess 80 is formed between each of the ridges 82. The width of the recess 80 may be substantially equal to the set fastener diameter. When the set fastener 92 is advanced until at least a portion of the set fastener 92 rests between two of the ridges 82 forming the recess 80. Thus, the set fastener 92 is secured between the two ridges 82 such that each of the ridges 82 simultaneously provides mechanical interference on two sides of the set fastener 92. If a user desires to adjust the spray distance of the liquid dispensing apparatus 10, the set fastener 92 may be removed or partially removed, the dispensing body 20 may be positioned relative to the holder sleeve 90, and then the set fastener 92 may be advanced until the dispensing body 20 is secured within the holder sleeve 90.

Figure 11A:
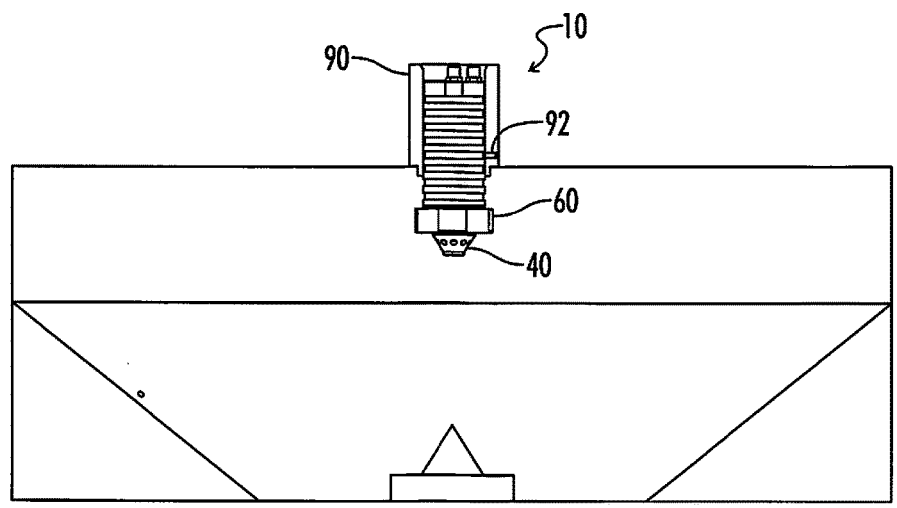
FIGS. 11A and 11B depict an exemplary embodiment of a liquid dispensing apparatus mounted on an exemplary seed treater, wherein the liquid dispensing apparatus is adjustable for providing an adjustable spray distance.
Figure 11B:
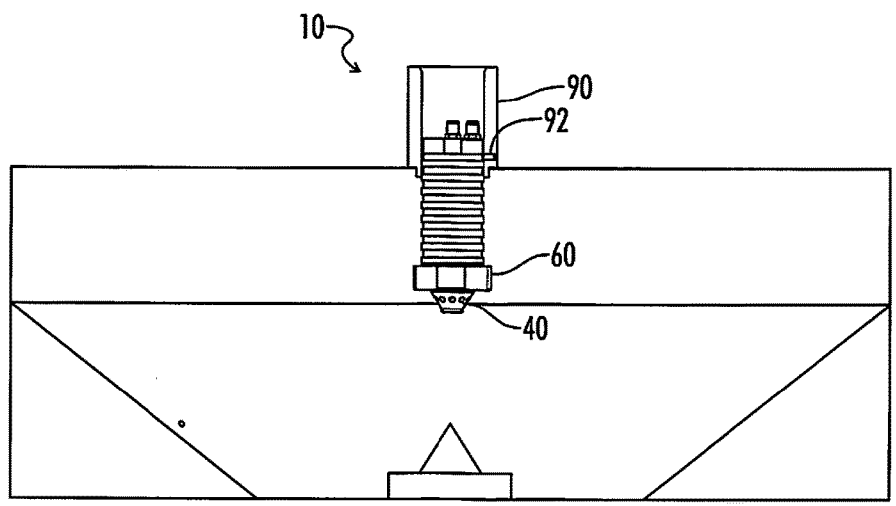

Referring to FIGS. 11A and 11B, the liquid dispensing apparatus 10 may be mounted to a seed treating apparatus. The liquid dispensing apparatus 10 may be operable to have an adjustable spray distance via the holder sleeve 90 and the set fastener 92. The nozzle 12 of the liquid dispensing apparatus 10 may be extended further into the seed treating apparatus or may be retracted to allow for a variable spray distance of the liquid dispensing apparatus 10. In some embodiments, the liquid dispensing apparatus 10 may be disposed in an internal drum 98 of the seed treating apparatus. The internal drum 98 may include an interior chamber 99 in which seeds may be contained for treatment. The internal drum 98 may rotate such that when the liquid dispensing apparatus 10 is activated and providing an atomized spray of a liquid substance, the seeds may be coated in the liquid substance as the internal drum 98 rotates. Although the liquid dispensing apparatus 10 is discussed with regards to a seed treating apparatus, it is contemplated in the disclosure that the liquid dispensing apparatus 10 could be applied in a variety of applications in which a liquid is to be dispensed under the conditions disclosed herein for droplet atomization.

Figure 12:
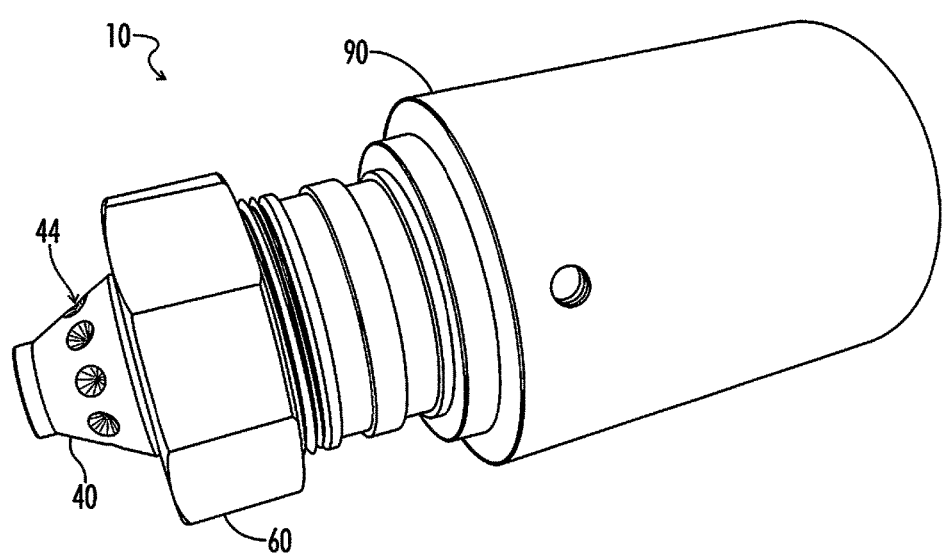
FIG. 12 depicts a perspective view of an exemplary embodiment of a multi-orifice spray device for use in a seed treatment application for liquid droplet atomization.

As shown in FIG. 12, a further embodiment of a multi-orifice spray device 10 for use in a seed treatment application for liquid droplet atomization. The device 10 includes a pressure chamber exit orifice 44 positioned on pressure cap 40 to emit a liquid spray onto seeds inside a seed treatment chamber. The pressure cap fastener 60 retains the pressure cap 40 on the device. One or more devices 10 may be installed in a seed treatment chamber for spraying seeds. In some embodiments, the device 10 is configured to emit liquid droplets using flow blurring droplet atomization.

A method of atomizing a liquid substance is also disclosed. The method includes providing the liquid to a liquid duct in a dispensing body and providing a gas to a gas duct in the dispensing body. The method may further include introducing the liquid into a head via a plurality of liquid duct channels, the head positioned proximate the dispensing body and introducing the gas into a pressure chamber of a pressure cap, the pressure cap positioned proximate the dispensing body such that the head is positioned between the pressure cap and the dispensing body. Further, the method may comprise expelling the gas through a plurality of pressure chamber exit orifices, the pressure chamber exit orifices positioned proximate a plurality of liquid supply channel exit openings and dispensing the liquid from the liquid supply channel exit openings and through the pressure chamber exit orifices, such that the liquid and the gas interact and form atomized droplets of the liquid.

Thus, although there have been described particular embodiments of the present invention of a new and useful Multi-Orifice Nozzle for Droplet Atomization, it is not intended that such references be construed as limitations upon the scope of this invention.

What is claimed is:

1. A multi-orifice nozzle for droplet atomization, comprising:
   a head defining an exterior head surface, the head having a plurality of liquid supply channels, a plurality of liquid supply channel entrance openings, and a plurality of liquid supply channel exit openings such that liquid enters the plurality of liquid supply channels at the liquid supply channel entrance openings and exits the plurality of liquid supply channels at the liquid supply channel exit openings;
   a pressure cap positioned proximate the head, the pressure cap defining a pressure chamber;
   a plurality of pressure chamber exit orifices defined in the pressure cap downstream of the plurality of liquid supply channel exit openings such that gas passing through the pressure chamber toward the plurality of pressure chamber exit orifices travels past the plurality of liquid supply channel exit openings; and
   an alignment spacer defined on the head, wherein the alignment spacer interfaces with the pressure cap such that each of the plurality of pressure chamber exit orifices is aligned with a corresponding liquid supply channel exit opening of the plurality of liquid supply channel exit openings,
   wherein the alignment spacer prevents relative rotation between the head and the pressure cap, and
   wherein the alignment spacer spaces each of the plurality of pressure chamber exit orifices from the corresponding liquid supply channel exit opening of the plurality of liquid supply channel exit openings.

2. The multi-orifice nozzle of claim 1, wherein:
   the exterior head surface includes a frustum-shaped portion; and
   the plurality of liquid supply channel exit openings are spaced on the frustum-shaped portion of the exterior head surface.

3. The multi-orifice nozzle of claim 1, wherein the head defines a loading chamber.

4. The multi-orifice nozzle of claim 3, wherein the plurality of liquid supply channel entrance openings are positioned adjacent the loading chamber.

5. The multi-orifice nozzle of claim 1, wherein the plurality of liquid supply channel entrance openings have a first diameter and the plurality of liquid supply channel exit openings have a second diameter less than the first diameter.

6. The multi-orifice nozzle of claim 1, wherein:
   the head is disposed about a head axis,
   the plurality of liquid supply channels are disposed about a plurality of liquid supply channel axes; and
   the plurality of liquid supply channel axes are positioned at an angle greater than 0 degrees and less than 180 degrees relative to the head axis.

7. The multi-orifice nozzle of claim 1, wherein the alignment spacer is a non-circular protrusion.

8. The multi-orifice nozzle of claim 7, wherein the pressure cap includes an alignment spacer receiver operable to receive the alignment spacer.

9. The multi-orifice nozzle of claim 1, wherein:
   the pressure cap includes an interior pressure cap end wall axially offset from each of the plurality of liquid supply channel exit openings by a distance H;
   each of the plurality of pressure chamber exit orifices includes a pressure chamber exit orifice diameter D; and
   the ratio of H divided by D is less than about 0.25.

10. A liquid dispensing apparatus for droplet atomization comprising:
    a dispensing body having a receiving end and a dispensing end, the dispensing body including a liquid duct and a gas duct defined in the dispensing body;
    a head positioned proximate the dispensing end of the dispensing body, the head having a plurality of liquid supply channels and a plurality of liquid supply channel exit openings such that liquid travelling from the liquid duct toward the plurality of liquid supply channel exit openings passes through the plurality of liquid supply channels;
    a pressure cap positioned proximate the dispensing end of the dispensing body and exterior the head relative to the dispensing body, the pressure cap defining a pressure chamber, the pressure chamber being in fluid communication with the gas duct;
    a plurality of pressure chamber exit orifices defined in the pressure cap and aligned with the plurality of liquid supply channel exit openings such that gas passing from the gas duct toward the plurality of pressure chamber exit orifices travels past the plurality of liquid supply channel exit openings; and
    an alignment spacer on the head, the alignment spacer operable to interface with the pressure cap such that each of the plurality of pressure chamber exit orifices is aligned with a corresponding liquid supply channel exit opening of the plurality of liquid supply channel exit openings,
    wherein the alignment spacer axially spaces each of the plurality of pressure chamber exit orifices from the corresponding liquid supply channel exit opening of the plurality of liquid supply channel exit openings.

11. The liquid dispensing apparatus of claim 10, wherein the dispensing body and the head define a loading chamber such that liquid passing from the liquid duct to the plurality of liquid supply channels passes through the loading chamber.

12. The liquid dispensing apparatus of claim 11, wherein the head further comprises a plurality of liquid supply channel entrance openings corresponding to the plurality of liquid supply channels, the plurality of liquid supply channel entrance openings positioned adjacent the loading chamber.

13. The liquid dispensing apparatus of claim 11, wherein the loading chamber is formed in the head.

14. The liquid dispensing apparatus of claim 10, wherein:
   the head defines an exterior head surface having a frustum-shaped portion; and
   the plurality of liquid supply channel exit openings are spaced on the frustum-shaped portion of the exterior head surface.

15. The liquid dispensing apparatus of claim 10, further comprising a pressure cap fastener operable to retain the pressure cap to the dispensing body.

16. The liquid dispensing apparatus of claim 10, wherein:
   the liquid duct is disposed about a liquid duct axis;
   the plurality of liquid supply channels are disposed about a plurality of liquid supply channel axes; and
   the plurality of liquid supply channel axes are positioned at an angle greater than 0 degrees and less than 180 degrees relative to the liquid duct axis.

17. The liquid dispensing apparatus of claim 10, further comprising a holder sleeve operable to retain the dispensing body.

18. The liquid dispensing apparatus of claim 17, further comprising:
   a plurality of recesses axially spaced along the dispensing body; and
   a set fastener for selectively retaining the dispensing body to the holder sleeve at an adjustable position via one of the plurality of recesses.

19. The liquid dispensing apparatus of claim 10, wherein:
   the pressure cap includes an interior pressure cap end wall axially offset from each of the plurality of liquid supply channel openings by a distance H;
   each of the plurality of pressure chamber exit orifices includes a pressure chamber exit orifice diameter D; and
   the ratio of H divided by D is less than about 0.25.

\* \* \* \* \*